April 21, 1970          D. R. PEARL          3,507,479

ROTATING SPIRAL LIQUID-GAS CONTACTOR

Original Filed June 18, 1965          5 Sheets-Sheet 1

INVENTOR
DAVID R. PEARL
BY: Richard H. Berneike
ATTORNEY

INVENTOR
DAVID R. PEARL
BY Richard H. Berneike
ATTORNEY

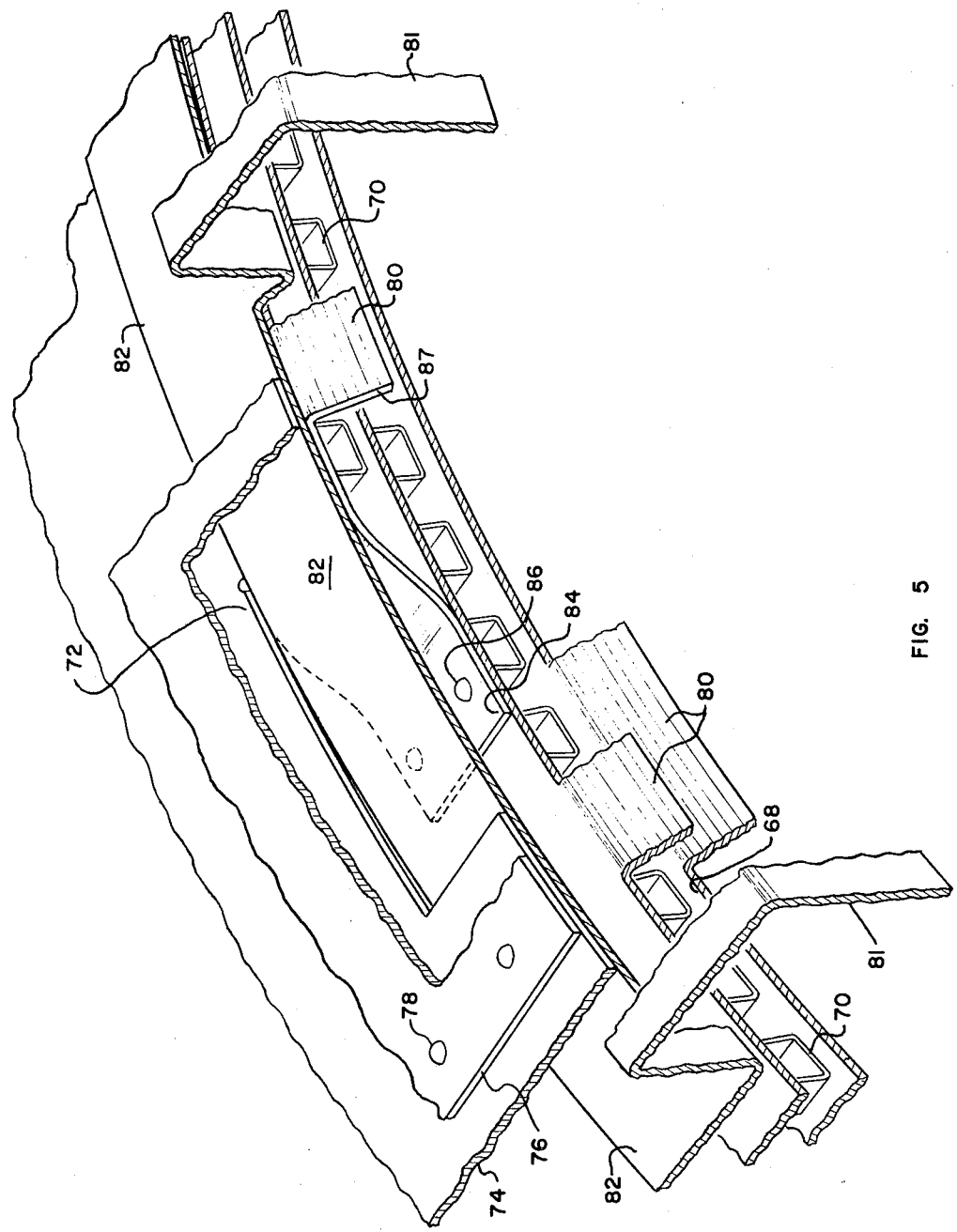

United States Patent Office
3,507,479
Patented Apr. 21, 1970

3,507,479
ROTATING SPIRAL LIQUID-GAS CONTACTOR
David R. Pearl, West Hartford, Conn., assignor to Combustion Engineering, Inc., Windsor, Conn., a corporation of Delaware
Continuation of application Ser. No. 465,063, June 18, 1965. This application Dec. 19, 1968, Ser. No. 786,836
Int. Cl. B01f 9/02, 3/04
U.S. Cl. 261—30                                    5 Claims

ABSTRACT OF THE DISCLOSURE

A liquid-gas contact apparatus having a rotor mounted on a horizontal axis with a spiral passageway leading from the hub to the outside of the rotor. The liquid is introduced into the passageway at the hub end and the rotation causes the liquid to flow outwardly through the spiral passageway in a continuous stream to the outside of the rotor where the liquid is collected in annular troughs and is removed by stationary scoops. The scoops include a nozzle, flaring and splash guard. The axial ends of the rotor are open to permit the gas to flow axially through the rotor over the liquid in the spiral passageway. The spiral passageway is formed by a sheet of material and spacers between adjacent windings of the sheet of material maintaining the spiral spacing. The spacers have openings therein for the flow of gas therethrough. The edges of the sheet of material adjacent the axial ends of the rotor are turned inwardly to form liquid retaining lips. A casing encloses the rotor and a portion of a gas duct. Dampers are controlled to cause a portion of the gas which has flowed through the rotor to be recirculated back to flow through the rotor again. Sealing means extends between the gas duct and the rotor to reduce gas leakage.

---

This application is a continuation of application Ser. No. 465,063 filed June 18, 1965, and now abandoned.

This invention relates to a dynamic liquid-gas contacting apparatus and more particularly to the use of a rotating spiral liquid-gas contactor.

Liquid-gas contact operations often present special problems, primarily due to the nature of the liquid, which render the use of conventional liquid-gas contact techniques undesirable or, in certain cases, impossible to employ. The present invention provides a technique for effecting liquid-gas contact which overcomes various deficiencies of other conventional techniques and which may be employed for a number of operations such as evaporating liquids, scrubbing gases, de-foaming liquids and carrying out reactions between liquids and gases.

Among the many advantages of the present invention, which will be more fully pointed out hereinafter, is the ability to suppress or eliminate the formation of foam. A problem which is often encountered in carrying out liquid-gas contact operations is the excessive foaming created as a result of the constant break-up of the liquid and the mixing thereof with the gases. Most conventional apparatus used for these contact operations requires that the mass of liquid be constantly broken up so as to obtain the required amount of contact between the liquid and gas within a reasonable amount of time without having prohibitively large apparatus. An example of a foaming liquid which can be beneficially treated by means of the present invention is the weak black liquor obtained from a paper pulping operation and specific reference will, therefore, be made to this process. It is to be understood, however, that the invention is not to be limited to such use.

The liquid-gas contact is achieved in the present invention by distributing the liquid into a flowing thin film (preferably turbulent flow) covering a large area and then passing the desired gas over the film. The unique apparatus and method employed permits the large area required to be compacted into a small space through the use of a rotating member which contains a spiral passageway through which the liquid flows. The invention also makes possible the formation of a thin film flowing at a velocity high enough to give turbulent liquid flow. A thin turbulent film is desirable to obtain adequate mixing of the liquid such that the reaction or process will not be limited to the near vicinity of the liquid-gas interface. The invention further provides unique means for conducting the liquid to and from the spiral passageway so as to further reduce the amount of flow break-up and splashing of the liquid. The further details as to how the inventive contact operation is achieved will follow hereinafter.

An object of the present invention is, therefore, to provide a technique and apparatus for distributing a liquid stream into a turbulently flowing thin film covering a large area and then collecting the liquid from the film into a discharge stream with a minimum amount of agitation or breakup of the flowing liquid.

Another object of the present invention is to provide a novel liquid-gas contact technique and apparatus with the liquid flowing in a relatively continuous stream under the effect of centrifugal force during the contact.

A further object of the present invention is to provide a liquid-gas contact technique and apparatus which will eliminate foam or prevent the formation of foam.

A specific object of the present invention is to provide an apparatus for oxidizing black liquor in a pulping operation.

Other objects and advantages of the invention will be apparent from the following detailed description of the exemplary apparatus when read in conjunction with the accompanying drawings wherein:

FIG. 5 is a detailed perspective view illustrating the manner in which the exterior portion of the rotor is formed;

Figure 1:
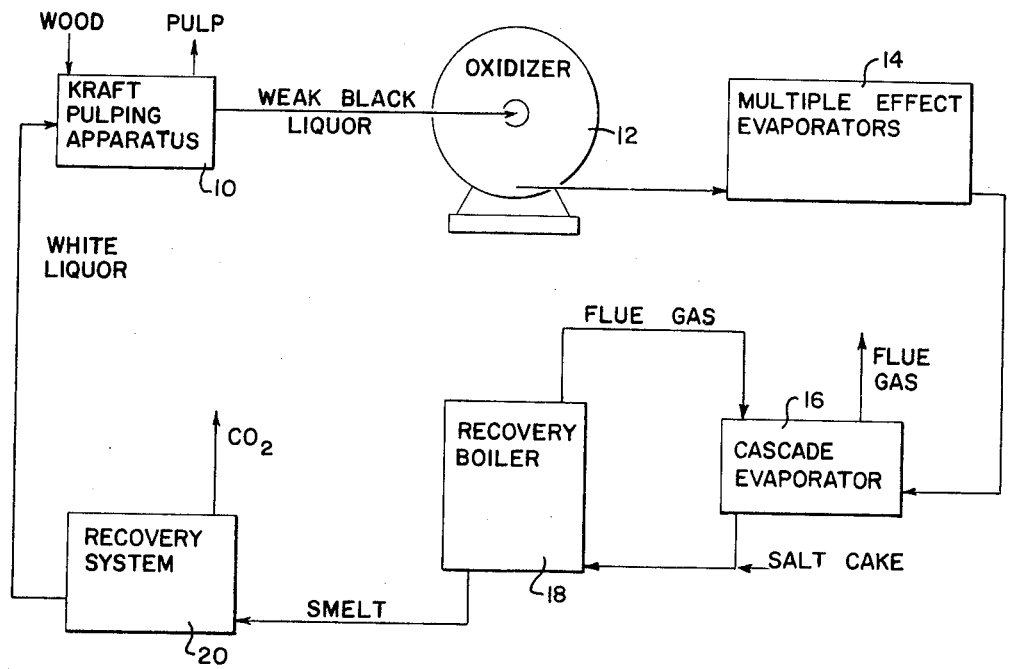
FIG. 1 is a flow diagram illustrating the use of the herein-disclosed liquid-gas contact apparatus in a pulping operation.

A sulfate (kraft) pulping operation is carried out by introducing the prepared wood and the pulping chemicals (white liquor) into the digester of the pulping mill. The wood and white liquor react to form the pulp and what is referred to as black liquor. This black liquor contains the pulping chemicals in their modified or reacted form. The black liquor is separated from the pulp and the commercial success of the Kraft process requires the recovery and re-use of the chemicals from this black liquor.

The conventional and well-known process for effecting this recovery includes the concentration of the liquor by evaporation and the burning of the liquor in what is referred to as a chemical recovery furnace or boiler. The flue gases from this furnace are conducted back through at least a portion of the evaporating equipment, such as a cascade evaporator, in which the hot flue gases are contacted directly with the black liquor. A smelt is formed in the bottom of the chemical recovery furnace which contains substantially all of the chemicals from the pulping operation. This smelt is withdrawn from the furnace and processed through a recovery system in which the chemicals in the smelt are converted to the form in which they existed before the pulping operation. These recovered chemicals are then returned to the digester in the pulping system. Such a pulping and chemical recovery system is illustrated and described in "Chemical Process Industries" by R. Norris Shreve, published by the McGraw-Hill Book Company, Inc., in 1945. The sulfate or kraft process is described on pages 704–708. Patent 2,936,215, issued to F. W. Hochmuth on May 10, 1960, is illustrative of a portion of the chemical recovery system including the recovery furnace, the cascade evaporators and the multiple effect evaporators.

A major problem with the type of chemical recovery proncess discussed above is that there is a significant release of sulfur compounds to the atmosphere, mainly in the form of hydrogen sulfide and mercaptans, which not only means a loss of valuable chemicals but which also creates a significant air pollution problem.

These obnoxious compounds are formed during the direct contact evaporation stage when the black liquor is contacted with the flue gases from the sulfides such as sodium sulfide ($Na_2S$) and the salts of mercaptans such as $CH_3SNa$ contained in the black liquor. One solution to this problem which has been attempted in the past is to oxidize these odor producing chemicals in the weak black liquor to convert the sulfides to thiosulfates such as sodium thiosulfate ($Na_2S_2O_3$) and the mercaptans to di-sulfides such as $(CH_3)_2S_2$. The thiosulfate is a more stable form for the sulfur and the di-sulfide product of the mercaptan has a boiling point of about 282° F. as compared to 45° F. for methyl mercaptan itself, thus greatly reducing the volatility. The advantages of oxidation can, therefor, be readily realized.

The oxidation of black liquor, however, presents many problems. The black liquor, like many other materials, has a tendency to foam excessively when agitated in contact with a gas. This is particularly true of the black liquor obtained from the pulping of soft woods and the foaming in these situations can create an almost insurmountable problem in designing effective liquid-gas contact apparatus. The most common apparatus presently used for such operations consists of the various forms of liquid-gas contact towers. These towers are large and expensive and create a serious foam problem as the air is passed upwardly through the black liquor. Other types of oxidizers that attempt to control or eliminate the foaming have high production costs or high operating costs or are otherwise ineffective.

Referring first to FIG. 1, there is illustrated a block diagram of a kraft pulping and chemical recovery system incorporating the liquid-gas contact apparatus of the present invention. This system comprises the pulping apparatus 10 which includes a digester as well as the necessary apparatus for preparing the wood for introduction into the digester. The effluent from the digester contains the pulp along with the weak black liquor which are then separated in a pulp washer. The separated weak black liquor from the pulp washer flows to the oxidizer 12 in which the sulfides and mercaptans are oxidized as previously discussed. The oxidized black liquor then flows to multiple effect evaporators 14 in which the liquor is concentrated by the evaporation of a portion of the water in the liquor. The concentrated or strong black liquor from the multiple effect evaporators is then introduced into the cascade evaporator 16 in which the liquor is contacted with flue gas from the recovery boiler which will be referred to hereinafter. The liquor, which has been even further concentrated in the cascade evaporator 16, is then fed along with salt cake ($Na_2SO_4$) to the recovery boiler 18 in which these materials are burned to form a smelt. This smelt, which contains primarily sodium sulfide and sodium carbonate, is then dissolved and processed through the conventional recovery system 20 in which the chemicals in the smelt are converted to the chemicals used in the pulping operation. These latter chemicals, which as a group are referred to as white liquor, are then recirculated to the digester in the pulping apparatus 10. The pulping apparatus 10, the multiple effect evaporators 14, the cascade evaporator 16, the recovery boiler 18 and the recovery system 20 are all of conventional design as illustrated in the previously referred to book by R. Norris Shreve and the Patent 2,936,215. It is to be understood that the present invention may be employed with various types of kraft recovery systems, such as those employing cyclone and venturi scrubbers in place of the cascade evaporator.

Figure 2:
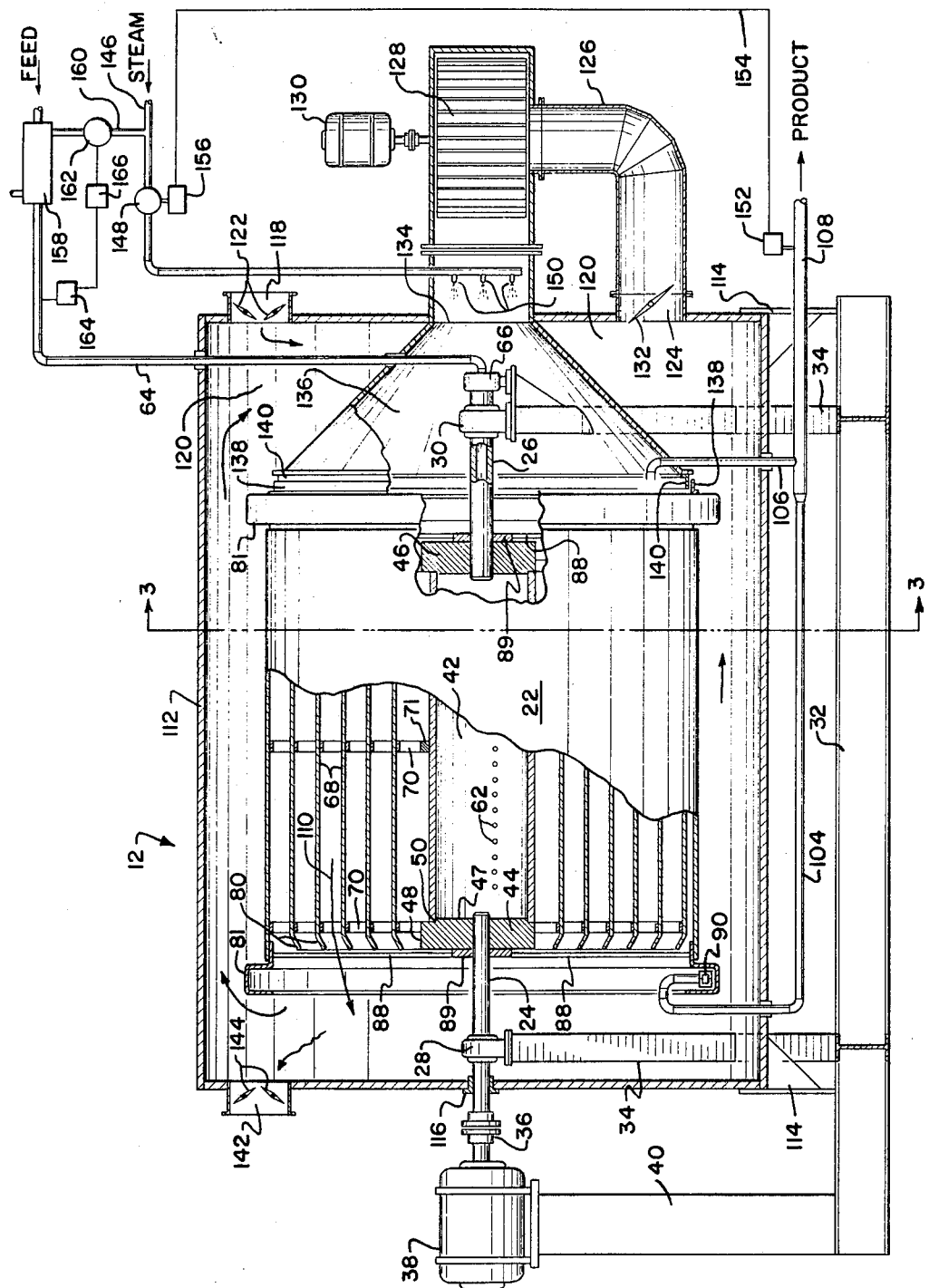
FIG. 2 is an elevation view of the liquid-gas contact apparatus partially in cross-section.
Figure 3:
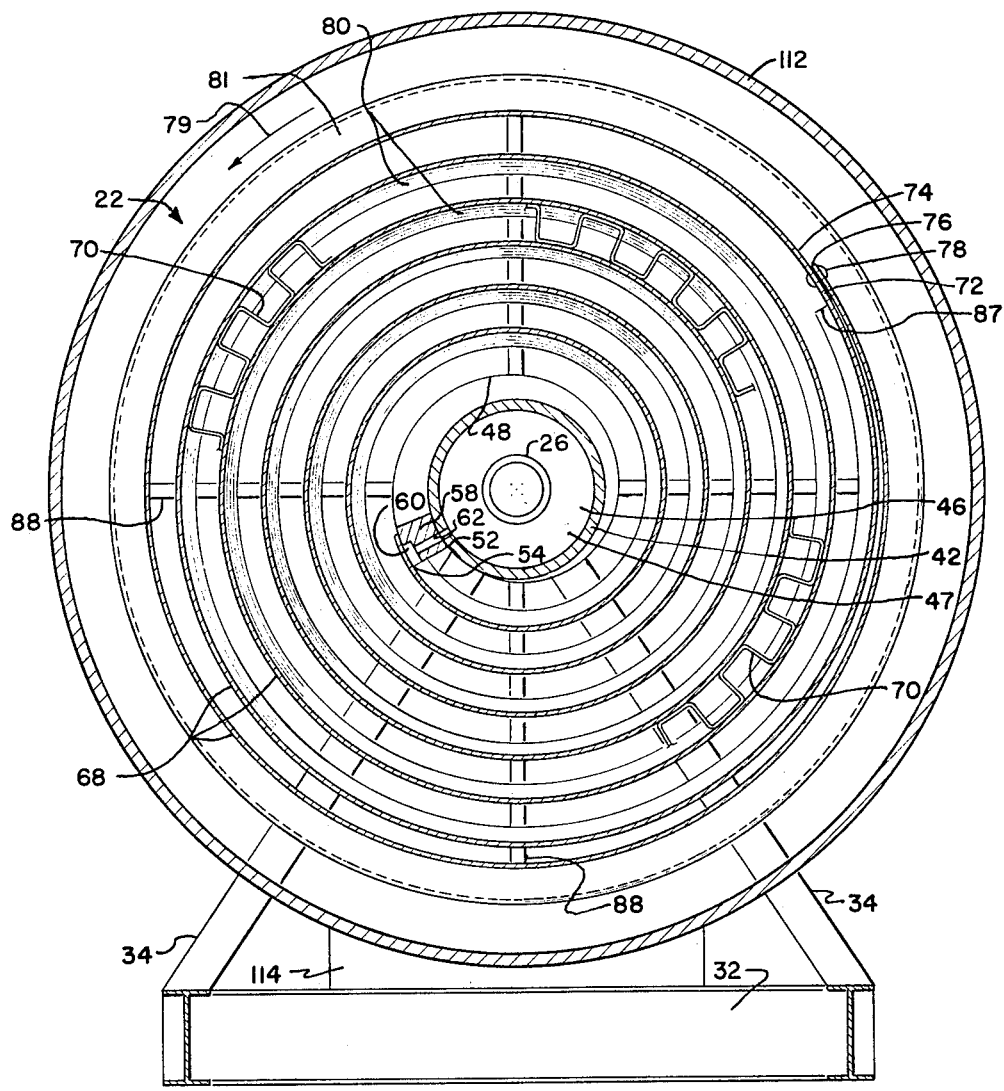
FIG. 3 is a section view taken along line 3—3 of FIG. 2.

The details of construction of the oxidizer 12 are most readily apparent in FIGS. 2 and 3. The basic component of the oxidizer comprises a rotor 22 supported by shafts 24 and 26. These shafts are supported by and rotated in bearings 28 and 30, respectively. A cross-section of the rotor appears in FIG. 3 while a side elevation partially in cross-section is shown in FIG. 2. The bearings are, in turn, supported on base 32 by braces 34. Shaft 24 is a solid shaft which is rigidly affixed to the rotor and which is connected through a flexible coupling 36 to motor 38 which serves to rotate the rotor 22. Motor 38 is likewise suitably supported on base 32 by support means 40. The central portion or core of the rotor itself comprises a cylindrical member 42 shown in FIG. 4, as well as FIGS. 2 and 3. End plates 44 and 46 are welded or otherwise suitably attached to each end of the cylindrical member 42 to form a hub. Shafts 24 and 26 are attached to the end plates 44 and 46, respectively such as by welding. These two shafts 24 and 26 are located with respect to the end plates such that the shafts are concentric with the cylindrical member 42. The radially outward surface 48 of the end plates 44 and 46 is not a true cylinder but is a uniformly generated spiral for a reason which will hereinafter be made clear. On the inside surface 47 of the end plates 44 and 46 there is a recess 50 which is concentric with the center of revolution of the rotor and into which the cylindrical member 42 is fitted to form the hub as best shown in FIG. 4.

Figure 4:
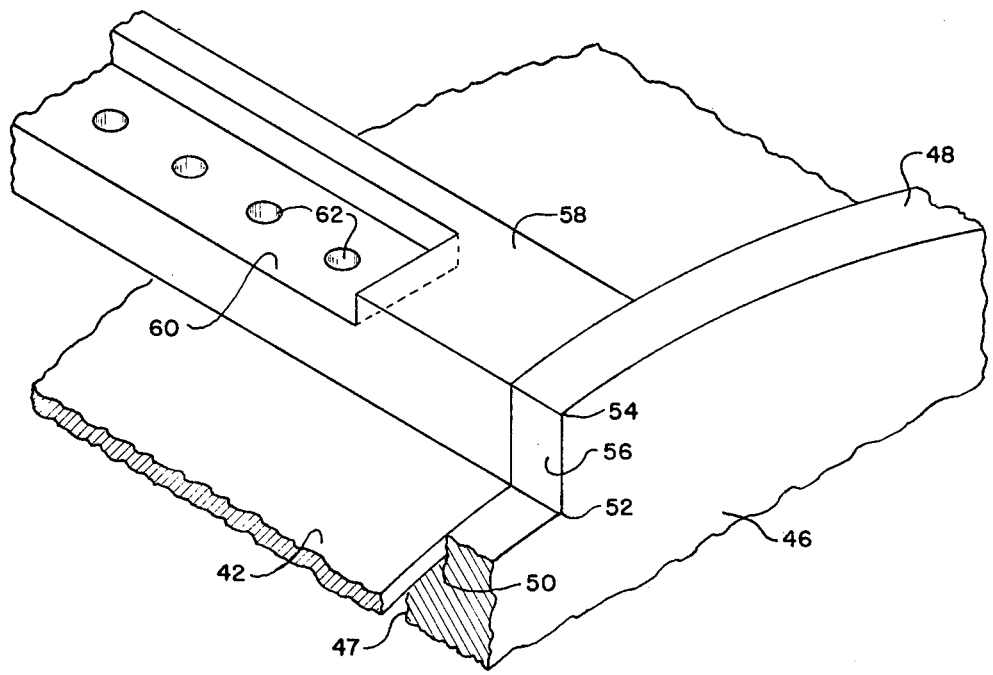
FIG. 4 is a detail view of a portion of the rotor and the means for introducing liquid to the spiral.

The uniformly generated spiral outer surface 48 of members 44 and 46 is also best shown in FIG. 4 wherein the spiral begins at point 52 and ends at point 54 forming a radially extending edge 56. Attached to the end plates at this point is a nozzle bar 58 which is also attached throughout its length to the cylindrical member 42. This nozzle bar has a recess 60 formed therein on the radially outward surface so as to form a nozzle or orifice slot for distributing liquid as will be more fully pointed out hereinafter. Holes 62 extend from the recess 60 in the nozzle bar 58 radially inwardly through the nozzle bar and the cylindrical member 42 so as to form a flow path for liquid from the interior portion of the hub to the recess 60. Liquid enters the cylinder 42 through shaft 26 which is hollow as shown in the cutaway portion in FIG. 2. The liquid is admitted to this hollow shaft 26 from conduit 64 via a suitable coupling 66.

One end of a sheet of material 68 is attached to the nozzle bar 58 as shown in FIG. 3. The sheet 68 is then wound around cylinder 42 in a uniformly generated spiral beginning from the point at which the sheet is attached to the nozzle bar 58. Spacer means 70 are employed to set and maintain the pitch of the spiral. The spacer means illustrated comprises a strip of sheet metal bent substantially in the form of a square wave so as to give adequate support in the radial direction while permitting flexure in the circumferential direction. This spacer means begins from a point on the exterior spiral surface 48 of the end plates 44 and 46 adjacent to the nozzle bar 58. After one revolution of the sheet 68 and the spacer means 70 the spacer means will lie on the top surface of nozzle bar 58 from which point it will continue upon the underlying or beginning portion of sheet 68. The spacer means has been illustrated in FIG. 3 throughout only a portion of the spiral passageway or channel for purposes of clarity although it is to be understood that the spacer extends continuously from the inside to the outside of the passageway. In the outer portion of the passageway where the space between convolutions begins to decrease due to the cylindrical overwrap, a different form of space means may be employed. For instance, shims may be used in place of a fixed-height spacer. Spacer means are located at both ends of the rotor and they may be located at any number of intermediate points depending upon the length of the rotor and the need for such structural support. One such intermediate spacer is illustrated in FIG. 2. It is, of course, necessary to provide a suitable support 71 for the first wrap of this spacer. The spacer means may be of the configuration shown or any other configuration which will permit gas to flow axially through the rotor between the adjacent convolutions of sheet 68 forming the spiral. The sheet 68 together with the spacer means 70 are then continuously wound to form the spiral until a sufficient number of turns and the required diameter have been formed.

The outer surface of the rotor 22 comprises a shell or container formed substantially in the shape of a cylinder. The formation of this cylinder or sheath is accomplished by continuing to wrap the sheet 68 into a cylinder after reaching a point at which the spiral ends. For instance, the spiral winding of the sheet ends at about point 72 as shown in FIGS. 3 and 5. From this point, sheet 68 continues around as indicated at 74 for ane complete revolution ending at 76. This final wrap forms the cylindrical outer surface. There may be additional outer cylindrical wraps if the outer surface needs additional stiffness or structural strength. The outer end of this sheet 68 is then riveted to the underlying layers of sheet 68 as indicated at 78. Of course, attaching means other than rivets may be employed.

Rotor 22 is preferably rotated in the same direction that the spiral is generated from the center outward as indicated by arrow 79 in FIG. 3 although the apparatus will function when rotated in either direction. The liquid contained in the cylindrical member 42 forming the hub flows outwardly under the action of centrifugal force through the holes 62 and into the recess or orifice 60. The orifice has the effect of uniformly distributing the liquid across the width of the spiral sheet 68. The orifice will also prevent flooding of the passageway or channel near the point of liquid introduction where centrifugal forces are minimum. The static and centrifugal pressures force the liquid to accelerate to a velocity in the circumferential direction. This velocity should ideally be equal to the steady state film velocity of the liquid in the spiral passageway. Under the action of centrifugal force the liquid will be thrown outwardly against the radially inward surface of sheet 68 as well as being forced outwardly through the spiral channel or passageway. The sides of sheet 68 are turned inwardly toward the axis of the rotor so as to form liquid retaining lips 80 which prevent the liquid which is flowing through the spiral passageway from being spilled from the ends of the rotor. These lips may be bent at any desired angle with respect to the sheet.

Of course, with a 90° bend, the lip height (the distance the lip extends in the radial direction) cannot be as great as the pitch of the spiral without blocking air flow. With a lesser bend, such as 45°, the lip height could exceed the pitch if desired to allow for local spiral deviations and low speeds which might cause spillage. The lips could also be formed by attaching a separate lip piece of metal, plastic or other suitable material to the spiral sheet instead of bending a lip from the spiral sheet. When the liquid reaches the end of the spiral it can no longer flow in the radial direction and it tends to build up inside the outer wrap. The only way the liquid can flow from this point is axially out either end of the rotor.

Since a prime concern of the invention is to maintain smooth, continuous liquid flow, the liquid flowing axially from the outer portion of the rotor must not be allowed to be thrown through the gas stream. For this reason, trough means 81 are attached to each end of the rotor into which the liquid flows. These trough means extend around the entire outer circumference of the ends of the rotor and extend radially outwardly from the outer surface of the rotor such that the liquid will flow into the trough means from the rotor under the action of centrifugal force. The manner in which the trough means are attached to the rotor is illustrated in FIG. 5. The troughs include axially extending ring portions 82 with which the trough means are attached to the rotor. Tabs 84 are cut from the edges of sheet 68 at the point 72 at which the spiral ends. The rings 82 are inserted over the edge portion of sheet 68 prior to this point 72 while the portion of sheet 68 following point 72 is wrapped around the outside of ring 82 so as to form the previously discussed cylindrical outer surface of the rotor. The tab means 84 which has been cut in sheet 68 to permit the insertion of ring 82 is bent downwardly from point 72 and is attached to the underlying convolution of sheet 68 by suitable means such as rivets 86. The liquid retaining lips 80 are no longer formed after reaching point 87 as indicated in FIGS. 3 and 5 so that after this point the liquid will flow axially outwardly into the trough means 81 unrestrained by the lips. The lip can merely be cut off after this point, as illustrated, or the sheet 68 may merely continue without the lip being bent inwardly.

The trough means, which are attached to the spiral forming sheet 68, maintain the spiral sheet in position. The trough means are maintained in position concentric with the hub by means of a plurality of spokes 88. These spokes have their inner ends affixed to ring members 89 which encircle shafts 24 and 26. These rings 89 primarily serve to locate the inner ends of the spokes and may be omitted. The spokes may be welded to the rings and the rings or the spokes or both welded to end plates 44 and 46 to prevent rotation of the trough relative to the hub. The outer ends of the spokes are affixed as by welding to the ring portions 82 of the troughs.

Figure 6:
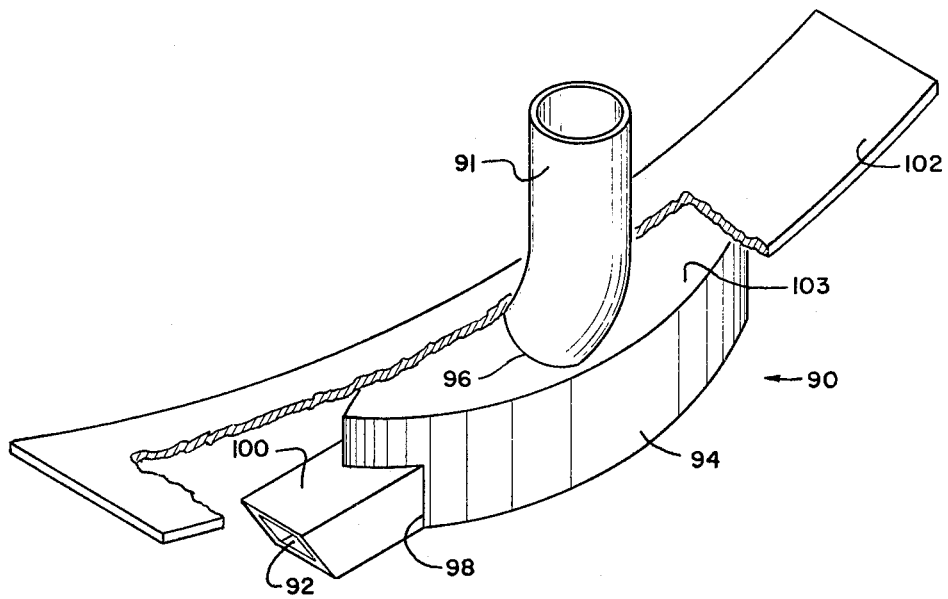
FIG. 6 is a perspective view of the scoop.

The liquid which has flowed axially from the outer end of the spiral passageway will be throw to the outer portions of the troughs and maintained therein under the action of centrifugal force. Since this liquid will be continuously flowing into the trough it is also necessary to continuously remove the liquid from the trough with the least possible agitation thereof. For this purpose one or more stationary scoops 90 are located so as to extend into the liquid in each of the troughs. These scoops, as best shown in FIGS. 2 and 6, are sahped, faired and baffled to permit efficient recovery of velocity pressure without causing turbulence, splashing or foaming. The scoop itself comprises a conduit 91 which projects into the trough generally perpendicular thereto. The conduit is then bent so that the opening or nozzle 92 at the end thereof will be oriented with respect to the direction of rotation such that the liquid will flow directly into the conduit. This end portion of the conduit is squeezed to a generally square shape so as to conform to the general outline of the trough. Since it is desirable to maintain the liquid in as steady and continuous a flow pattern as possible, the conduit 91 is surrounded by fairing 94 which is shaped as shown in FIG. 6 so as to cause the liquid to flow around the scoop without significant disruption of the flow pattern. This device 94, which is generally boat-shaped has a hole 96 in the upper portion thereof through which the conduit 91 extends. The square end 92 of the conduit 91 then extends through the cut-out portion 98 of the device 94. As the liquid is flowing around with the troughs it will have a tendency to strike the upper surface 100 of the end portion of conduit 91 at an angle and splash out of the troughs. In order to prevent this splashing a curved plate or baffle 102 is attached to the upper surface 103 of the device 94. This plate has a curvature conforming to the curvature of the trough and extends a substantial distance in either direction so as to be effective in preventing splashing from any portion of the scoop means. The liquid contained in the troughs is rotating with the troughs and the tangential velocity thereof is converted into flow through the discharge system. The liquid picked up in the scoops is transferred via conduits 104 and 106 to the discharge line 108. FIG. 2 illustrates one scoop at each end of the rotor although it is to be understood that any number of such scoops may be located at each end of the rotor and at any desired location around the circumference of the rotor.

The gaseous phase with which the liquid flowing in the rotor is to be contacted flows axially through the rotor from one end to the other between the convolutions of the spiral as illustrated by the arrow 110 in FIG. 2. The gas will thus be flowing in a direction generally perpendicular to the direction of the liquid flow although probably not truly perpendicular due to the rotation of the rotor. It is for this reason that the spacer elements 70 must be of an open configuration so as to permit the gas to flow therethruogh.

The device illustrated in FIG. 2 is constructed so as to cause air to flow through the rotor and be contacted with the liquid. The rotor is completely enclosed within a casing or housing 112 as shown in FIGS. 2 and 3. This casing is supported on base 32 by means of the supports 114. Suitable bushing means 116 are provided to permit shaft 24 to extend through the casing 112. The air is admitted to the casing through the opening 118 to a plenum chamber 120. The air admitted to this plenum chamber is controlled by means of the dampers 122. From the plenum chamber the air flows through the opening 124 in the casing through conduit 126 to the fan 128 which is driven by the motor 130. The air flow from the plenum chamber to the fan is controlled by means of the damper 132. From the fan the air flows back through the opening 134 in the casing 112. This opening, which is generally circular, is surrounded by a duct or cone 136, which is illustrated partially in cross-section in FIG. 2, which extends from the casing 112 to a point adjacent to the rotor. The space within the casing 112 and around the outside of cone 136 defines the previously mentioned plenum chamber 120. The air flowing from the fan through the opening 134 will be confined by the cone 136 and conducted to and through the rotor. Attached to the trough at the end of the rotor adjacent the cone 136 is an annular member 138 projecting therefrom. Attached to the cone is a circular flexible member 140 made of some material such as rubber which lies inside of the member 138. Members 138 and 140 are in close proximity so as to form somewhat of an air seal between the cone and the rotor. However, these members are not so close as to be touching each other since the member 138 rotates about the member 140.

Opening 142 in the casing 112 is provided to permit the air which has flowed through the rotor to be discharged from the casing. Dampers 144 are provided to control this air flow. For reasons which will be made clear hereinafter, it is sometimes desirable to recirculate at least a portion of the air or other gaseous material. Such recirculated air flows back around the outside of the rotor between the rotor and the casing 112 and into the plenum chamber 120. The dampers 122, 132 and 144 may be used to control the amount of air that is recirculated. The velocity of the air or other gas passing through the rotor should be such that good liquid-gas contact is realized. This preferably requires turbulent gas flow as well as turbulent liquid flow. Even though there may be turbulent flow in both the liquid and gas phases, the high velocity acceleration forces in the rotor keep the two phases from mixing and foaming.

Various types of liquid-gas contact operations require that either the liquid or the gas or both the liquid and the gas be heated and maintained at particular temperatures during the operation. As an example it has been found that the oxidation of black liquor cannot be readily carried out at a temperature below about 160° F. The air which is used to oxidize the black liquor will evaporate the water from the liquor as the oxidization reaction is being carried on. This evaporation will have a tendency to cool the liquor. Also, if the gas itself is at a temperature below 160° F. the liquor will be cooled by the air through conduction. Various controls have been devised for maintaining the desired variable of the process at a predetermined value and these controls will be discussed hereinafter. However, for the purpose of maintaining black liquor at the proper reaction temperature it has been found desirable to spray steam directly into the air stream before it is conducted through the rotor. This steam will not only heat the air so as to prevent direct cooling of the liquor but it will also humidify the air and thus reduce the amount of evaporation of water from the black liquor and thus the amount of evaporative cooling. The steam is conducted to the apparatus through conduit 146 and valve 148 and is sprayed into the air stream through the nozzles 150. The amount of steam which is sprayed into the air is controlled by adjusting valve 148. This valve is controlled by measuring the temperature of the oxidized black liquor flowing from the oxidizer in conduit 108 by the sensing or measuring device 152. This temperature reading is fed via line 154 to the valve control 156.

The oxygen content of air which has made one pass through the rotor and thus one contact with the liquid will be reduced only very slightly and thus the air may be recirculated and re-used for additional passes through the rotor. This recirculation is desirable since the air has been heated and humidified by the steam and the recirculation will conserve sensible heat and the moisture content and thus reduce the amount of steam necessary. Arrows in FIG. 2 indicate the manner in which the air flows in opening 118, out opening 142 and back around the rotor for recirculation.

The oxidation reaction of the black liquor must be carried out at a specific temperature as previously stated. In the event that the incoming weak black liquor is not up to the desired temperature it is necessary to heat the liquor. For this purpose heating means 158 is provided in conduit 64. Steam from line 146 is fed to this heating means via conduit 160 and valve 162. This valve 162 controls the amount of steam fed to the heating means 158 and is regulated by means of the temperature measuring device 164 and regulator 166.

Figure 7:
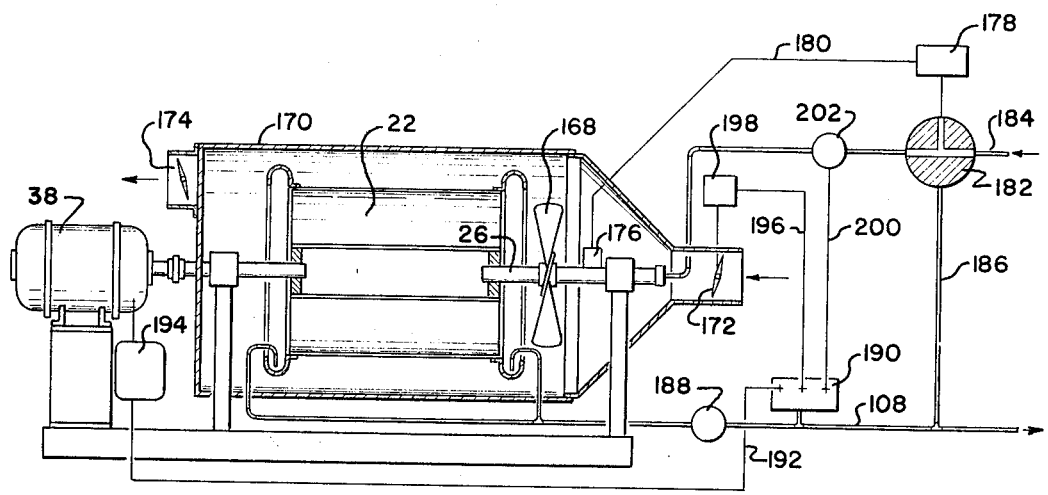
FIG. 7 illustrates an alternative arrangement of the invention together with various control features.

FIG. 7 schematically illustrates an alternative arrangement of the liquid-gas contact apparatus of the present invention, particularly with respect to the blower means and the control means. The rotor 22 of this alternative arrangement has the blower means in the form of a fan or propeller 168 attached directly thereto. This propeller is mounted on the shaft 26 of the rotor such that the motor 38 will drive both the rotor and the blower. The casing 170 in FIG. 7 and the inlet damper 172 and the outlet damper 174 located in the openings of the casing are all suitably arranged to accommodate the modified form of blower. It is obvious that many arrangements may be employed for forcing the air through the rotor. For example, when the liquid contact apparatus is employed in an operation wherein it is necessary to inject steam into the gas, a steam injector could be employed to draw the air in and force it through the rotor along with the steam.

A malfunction in the drive means for the rotor or a loss of power to the rotor drive means so as to either slow down or stop the rotor might cause the liquor to drop from the spiral surface and flood the rotor. To prevent this from occurring a speed sensing device 176 is affixed to the rotor shaft 26. This speed sensing device controls a valve operator 178 through line 180. This control circuit is pre-set so that when a rotative speed is reached below which the liquid film will not be sustained on the spiral surface, the valve operator 178 will move the three-way valve 182 to the position which will permit the weak black liquor flowing into the apparatus through conduit 184 to by pass the spiral contactor through conduit 186. Back-flow into the spiral contactor of the liquid by passing in conduit 186 is prevented by a check valve 188 in discharge conduit 108.

Various control devices are shown in FIG. 7 controlling various parameters on the basis of some property of the liquid being discharged from the spiral contactor. Measuring device 190 affixed to the discharge conduit 108 measures the desired property such as the conductivity of the discharged liquid. This measuring device 190 is set up so as to control any one of three selected variables. Line 192 from the measuring device is attached to a motor speed control 194 which, in turn, controls the speed of motor 38 and, therefore, the speed of both the rotor and the blower. Line 196 from the measuring device is attached to control device 198 which controls the position of the damper 172 and thus controls the amount of air being admitted to the spiral contactor. The third line 200 from the measuring device is attached to a throttling valve 202 which controls the amount of liquid being fed to the rotor.

I claim:
1. Liquid-gas contact apparatus comprising:
  (a) a rotor, said rotor mounted for rotation on a horizontal axis and having two axial ends and comprising
    (1) a hollow hub,
    (2) a cylindrical outer shell concentric with said hub and having two axial ends,
    (3) a sheet of material having one end thereof attached to said hub, said sheet of material being wound around said hub in a uniform spaced spiral and having the other end thereof attached to said outer shell thereby forming a spiral channel,
    (4) spacer means between adjacent windings of said sheet to maintain said spiral spacing, said spacer means having openings therein to permit gas flow therethrough,
    (5) annular troughs attached to said axial ends of said outer shell and extending radially outwardly therefrom,
    (6) at least one opening through said hub forming a flow path from the inside of said hub to said spiral channel,
  (b) means for supplying liquid to the inside of said hub,
  (c) drive means for rotating said rotor whereby said liquid in said hub will flow outwardly under the effect of centrifugal force through said opening in said hub, through said spiral channel and into said troughs,
  (d) stationary scoops extending at least partially into said troughs to scope said liquid therefrom,
  (e) a duct terminating adjacent one of said axial ends of said rotor,
  (f) means for causing a gas to flow into said duct towards said rotor whereby said gas will flow through said rotor from one axial end thereof to the other axial end.

2. Liquid-gas contact apparatus according to claim 1 wherein the edges of said sheet of material adjacent said axial ends of said rotor are turned inwardly to form liquid retaining lips.

3. Liquid-gas contact apparatus according to claim 2 and further including a casing enclosing said rotor and at least a portion of said duct and control means for causing at least a portion of the gas which has flowed through said rotor to be recirculated within said casing back around said rotor and into said duct to flow through said rotor again.

4. Liquid-gas contact apparatus according to claim 3 wherein said scoop comprises a nozzle, fairing and a splash guard.

5. Liquid-gas contact apparatus according to claim 3 wherein said duct is circular in cross-section and further including sealing means between said duct and said rotor to reduce gas leakage.

References Cited
UNITED STATES PATENTS

| | | |
|---|---|---|
| 866,706 | 9/1907 | Zellwegen. |
| 1,206,590 | 11/1916 | Purdue. |
| 2,016,003 | 10/1935 | Gantvoort. |
| 2,109,375 | 2/1938 | Podbielniak. |
| 2,209,577 | 7/1940 | Podbielniak. |
| 2,575,690 | 11/1951 | Smith. |
| 2,936,215 | 5/1960 | Hochmuth. |
| 3,228,595 | 1/1966 | Sharples. |

FOREIGN PATENTS

| | | |
|---|---|---|
| 10,299 | 1891 | Great Britain. |

RONOLD R. WEAVER, Primary Examiner

U.S. Cl. X.R.

23—269; 233—13; 261—83